US012379979B2

(12) United States Patent
Shaikh et al.

(10) Patent No.: US 12,379,979 B2
(45) Date of Patent: Aug. 5, 2025

(54) METHOD AND SYSTEM FOR MANAGING APPLICATION LOGS

(71) Applicant: Rakuten Symphony, Inc., Tokyo (JP)

(72) Inventors: Arshil Shaikh, Indore (IN); Rounak Lahoti, Indore (IN); Shekh Shadab, Indore (IN); Himani Neema, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/923,460

(22) PCT Filed: Sep. 13, 2022

(86) PCT No.: PCT/US2022/043270
§ 371 (c)(1),
(2) Date: Nov. 8, 2022

(87) PCT Pub. No.: WO2024/010598
PCT Pub. Date: Jan. 11, 2024

(65) Prior Publication Data
US 2025/0077314 A1      Mar. 6, 2025

(30) Foreign Application Priority Data
Jul. 7, 2022   (IN) ............................. 202241039118

(51) Int. Cl.
*G06F 9/54*        (2006.01)
(52) U.S. Cl.
CPC .............. *G06F 9/542* (2013.01); *G06F 9/541* (2013.01)

(58) Field of Classification Search
None
See application file for complete search history.

(56) References Cited

U.S. PATENT DOCUMENTS

2007/0207800 A1    9/2007  Daley et al.
2014/0109188 A1*   4/2014  Pavlov .................... G06F 11/30
                                                     709/217

(Continued)

OTHER PUBLICATIONS

Written Opinon dated Jan. 10, 2023 in International Application No. PCT/US22/43270.

(Continued)

*Primary Examiner* — Craig C Dorais
(74) *Attorney, Agent, or Firm* — Sughrue Mion, PLLC

(57) ABSTRACT

Embodiment herein provides a method for managing application logs by an system (100). The method includes detecting, by the system (100), event associated with application stored in the system (100) and creating, by the system (100), application log file while the event associated with the application is performed at the system (100). The application log file includes a URL used to call API associated with the application while the event is performed, a response received through the API associated with the application while the event is performed from an application server (1000) and a payload. The method also includes determining, by the system (100), that the event associated with the application is completed; and automatically uploading, by the system (100), the application log file and information associated with the system (100) to an application server (1000) corresponding to the application.

13 Claims, 9 Drawing Sheets

(56) References Cited

U.S. PATENT DOCUMENTS

| | | | |
|---|---|---|---|
| 2016/0019102 A1* | 1/2016 | Cui | G06F 8/74 |
| | | | 719/328 |
| 2019/0026163 A1 | 1/2019 | Subbiah et al. | |
| 2019/0163610 A1 | 5/2019 | Vent | |
| 2020/0081814 A1* | 3/2020 | Srinivasan | G06F 8/71 |
| 2021/0357397 A1 | 11/2021 | Jha et al. | |

OTHER PUBLICATIONS

International Search Report dated Jan. 10, 2023 in International Application No. PCT/US22/43270.
Åström, "Log File Highlighter", Visual Studio, 2022, pp. 1-5 (5 Pages total).

* cited by examiner

```
URL        :rest/SampleClass/sampleMethod

JSON       :{"visibleList":[936799,936801,936803,936805,936807,936809],"enabledList":[936799, Header         :{"Referer":"https://test.example.com/","versionname":"5.3.0","Content-Typ statusCode     :200 responseMsg return by server   :

response return by user        :{"status":"success"}
```

FIG. 3B

| ≡ Administration | | Application server 1000 | | | ⚲ ⌂ ▦ ○ |
|---|---|---|---|---|---|
| ← Logs | | | | | |⠇|
| App Version | State Name | Citizenship Id | Login User | Date | Actions |
| 2.8.5 | KAR | 8637310454475981 | abc.ijk@XYZ.com | 14-Mar-2022 15:28:04 | ⋯ |
| 2.8.5 | KAR | 8637310454475981 | abc.ijk@XYZ.com | 14-Mar-2022 15:26:26 | ⋯ |
| 2.8.5 | KAR | 8637310454475981 | abc.ijk@XYZ.com | 14-Mar-2022 15:25:05 | ⋯ |
| 2.0.9 | DEL | | def.sss@UVW.com | 10-Mar-2022 15:06:22 | ⋯ |
| 2.0.9 | DEL | | def.sss@UVW.com | 10-Mar-2022 15:06:20 | ⋯ |
| 2.0.9 | RAJ | | def.sss@UVW.com | 10-Mar-2022 15:06:18 | ⋯ |

Page: ▽ 1  Rows per page: ▽ 25  1 - 25 of 12679

FIG. 4A

| App Version | State Name | Citizenship Id | Login User | Date | Actions |
|---|---|---|---|---|---|
| 2.8.5 | KAR | 86373104545475981 | abc.ijk@XYZ.com | 14-Mar-2022 15:28:04 | Download |
| 2.8.5 | KAR | 86373104545475981 | abc.ijk@XYZ.com | 14-Mar-2022 15:26:26 | ... |
| 2.8.5 | KAR | 86373104545475981 | abc.ijk@XYZ.com | 14-Mar-2022 15:25 | 402 |
| 2.0.9 | DEL | | def.sss@UVW.com | 10-Mar-2022 15:0 | ... |
| 2.0.9 | DEL | | def.sss@UVW.com | 10-Mar-2022 15:06:20 | ... |
| 2.0.9 | RAJ | | def.sss@UVW.com | 10-Mar-2022 15:06:18 | ... |

Page: v1    Rows per page: 25    1 – 25 of 12679

METHOD AND SYSTEM FOR MANAGING APPLICATION LOGS

CROSS REFERENCE TO RELATED APPLICATIONS

This application is a National Stage of International Application No. PCT/US2022/043270 filed Sep. 13, 2022, claiming priority based on India patent application No. 202241039118 filed Jul. 7, 2022.

FIELD OF INVENTION

The present invention relates to application logs and more specifically related to a method and system for managing application logs based on an event.

BACKGROUND

In general, events associated with an application in a system may generate log events or a historical record of events occurring during running of the application. For example events that occurred when booting the system, recording access to the system, and backing up files on the system, etc. The events are gee rally recorded in an application log file. When a technical problem is detected in the system, a developer can access application log files and retrieve information, which can be analyzed to determine a cause of the problem which can then be troubleshot effectively. Further, the developer may benefit from viewing the information about any of the events that occurred during the execution of the application which can help in diagnosing problems or answering questions related to results of the execution of the application.

However, for getting the application log files generally user credentials are requested from a user which may at times cause user data privacy concerns. Also, to be able to troubleshoot the problem effectively, exact same data provided by the user at the time of execution of the application needs to be inserted to regenerate the problem scenario that the user faced. This process is very inconvenient as it is not possible to get exact data provided by the user and hence getting the same error every time. As a result, the existing methods are very time consuming with no immediate results. Also, the existing method record application log files mostly as crash reports with no solution for local failures. Thus, it is desired to address the aforementioned disadvantages or other shortcomings or at least provide a useful alternative.

OBJECT OF INVENTION

The principal object of the embodiments herein is to provide a method and system for managing application logs. by automatically generating an application log file to store data like application program interface (API) call uniform resource locator (URL), response, payload etc. and upload it to an application server on predefined event with additional information of the system. The proposed method helps a developer to easily identify error event failure based on the application log file and the information of the system.

SUMMARY

Accordingly, the embodiment herein is to provide a method for managing application logs by a system. The method includes detecting, by the processor, event associated with application stored in the system and creating, by the processor, application log file while the event associated with the application is performed at the system. The application log file includes a URL used to call API associated with the application while the event is performed, a response received through the API associated with the application while the event is performed from an application server and a payload associated with the at least one event. The method also includes determining, by the processor, that the event associated with the application is completed; and automatically uploading, by the processor, the application log file and information associated with the system to an application server corresponding to the application.

In an embodiment, creating, by the processor, the application log file while the event associated with the application is performed at the system includes determining, by the processor, data entered by a user to the system, the URL used to call the API associated with the application while the event is performed the response received from the application server, through the API associated with the application while the event is performed and the payload associated with the at least one event while the event associated with the application is performed at the system. Further, the method also includes continuously writing, by the processor, the data entered by a user to the system, the URL used to call the API associated with the application while the event is performed: the response received from the application server, through the API associated with the application while the event is performed and the payload associated with the at least one event while the event associated with the application is performed at the system to the application log file; and creating, by the processor, the application log file while the event associated with the application is performed at the system.

In an embodiment, the method further includes determining, by the processor, whether the upload of the application log file and the information associated with the system to the application server corresponding to the application is successful. The method also includes performing, by the processor, determining a location of the application log file stored in a memory of the system and deleting the application log file stored in the memory of the system, in response to determining that the upload of the application log file and the information associated with the system to the application server corresponding to the application is successful, and detecting a user login to the application, determining application log file in the memory of the system, uploading the application log file stored in the memory of the system to the application server, and deleting the application log file stored in the memory of the system, in response to determining that the upload of the application log file and the information associated with the system to the application server corresponding to the application is not successful.

In an embodiment, the information associated with the system includes username associated with the application in the system, an application version running on the system, a date of the event detected on the system, data inserted by a user to the application in the system.

In an embodiment, the method further includes receiving, by the application server, the information associated with the system an input and filtering, by the application server, the application log file of a plurality of application log files corresponding to the received information associated with the system. Further, the method also includes receiving, by the application server, a request to download the filtered application log file of the plurality of application log files corresponding to the received information associated with the system: downloading, by the application server, the application log file of the plurality of application log files corresponding to the received information associated with the system; and regenerating, by the application server, the event detected in the system based on the application log file.

In an embodiment, the creating, by the processor, the application log file while the event associated with the at least one application is performed at the system includes determining, by the processor, an event status associated with the at least one event as one of a failed event and a successful event. The method also includes appending, by the processor, at least one of: an event status parameter and a color strip indicating the event status associated with the at least one event, to the at least one application log file; and creating, by the processor, the at least one application log file.

In an embodiment, the automatically uploading, by the processor, the application log file and the at least one information associated with the system includes checking, by the processor, the at least one application log file is available in the memory of the system at an elapse of a time threshold; and automatically uploading, by the processor, the at least one application log file available in the memory of the system to the application server.

Accordingly, the embodiments herein provide a system for managing application logs. The system includes a memory, a processor, a communicator and a. The processor is configured to detect event associated with application stored in the system and create application log file while the event associated with the application is performed at the system. The application log file includes a URL used to call API associated with the application while the event is performed, a response received through the API associated with the application while the event is performed from an application server and a payload associated with the at least one event. The processor is configured to determine that the event associated with the application is completed and automatically upload the application log file and information associated with the system to an application server corresponding to the application.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 3B is an example illustrating the application log file created, according to an embodiment as disclosed herein:

FIG. 4A is an example illustrating a plurality of application log files uploaded to an application server, according to an embodiment as disclosed herein:

FIG. 4B is an example illustrating a download option provided with respect to the application log file, according to an embodiment as disclosed herein:

FIG. 4C is an example illustrating a filter window of the application server, according to an embodiment as disclosed herein; and FIG. 4D is an example illustrating the filtered application log files of the plurality of application log files uploaded to the application server, according to an embodiment as disclosed herein.

DETAILED DESCRIPTION OF INVENTION

Figure 1:
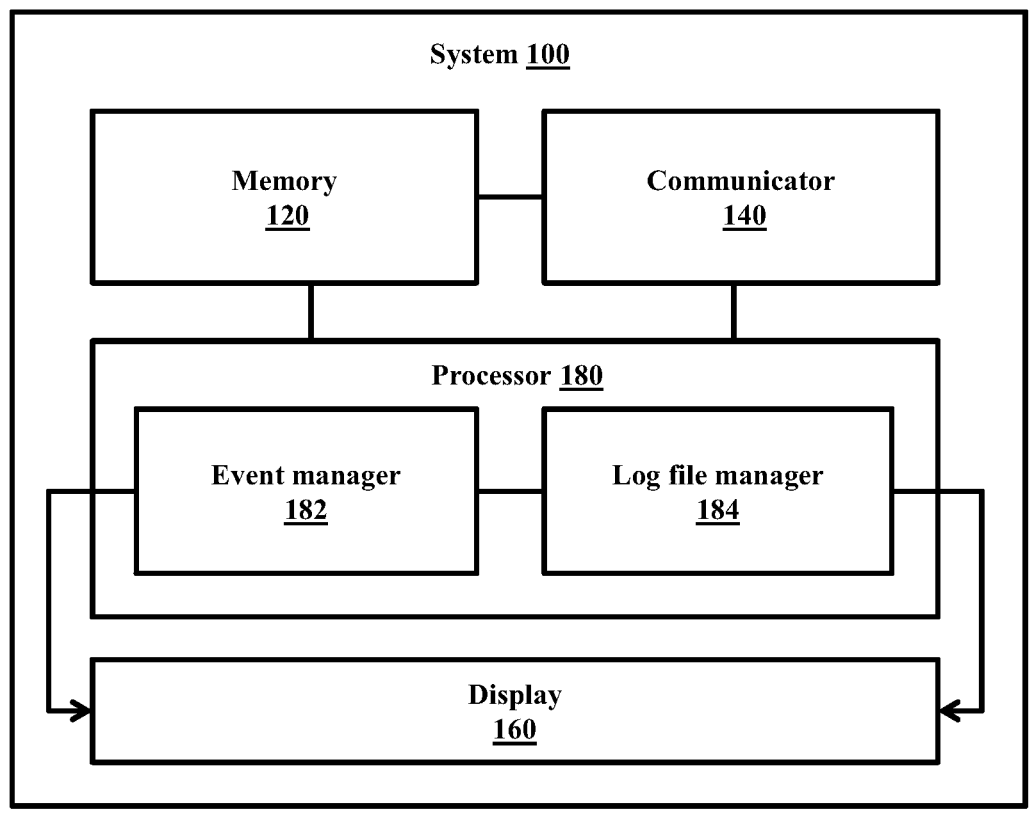
FIG. 1 is a block diagram of an system for managing application logs, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a method for managing application logs by an system. The method includes detecting, by the system, event associated with application stored in the system and creating, by the system, application log file while the event associated with the application is performed at the system. The application log file includes a URL used to call API associated with the application while the event is performed, a response received through the API associated with the application while the event is performed from an application server and a payload. The method also includes determining, by the system, that the event associated with the application is completed; and automatically uploading, by the system, the application log file and information associated with the system to an application server corresponding to the application.

Accordingly, the embodiments herein provide an system for managing application logs. The system includes a memory, a processor, a communicator and a display. The processor is configured to detect event associated with application stored in the system and create application log file while the event associated with the application is performed at the system. The application log file includes a URL used to call API associated with the application while the event is performed, a response received through the API associated with the application while the event is performed from an application server and a payload associated with the at least one event. The processor is configured to determine that the event associated with the application is completed and automatically upload the application log file and information associated with the system to an application server corresponding to the application.

In Unlike to the conventional methods and systems, the proposed method includes generating the application log file which includes customized logs in a single file on predefined events and uploading the application log file to the application server when the predefined event is completed.

In conventional methods and systems, for getting the application log files user credentials are requested from a user which may at times cause user data privacy concerns and hence not shared which makes it difficult to troubleshoot the problem.

In conventional methods and systems, to be able to troubleshoot the problem effectively, exact same data provided by the user at the time of execution of the application needs to be inserted to regenerate the problem scenario that the user faced. This process is very inconvenient as it is not possible to get exact error every time. As a result, the existing methods are very time consuming with no immediate results.

In conventional methods and systems, libraries in the system support only crash report generation i.e., only if the application crashes that case is addressed. But local failures are not addressed such as API data failure, etc. Therefore, tracking the exact process followed by the user when there are a large number of steps executed by the user is very cumbersome.

Unlike to the conventional methods and systems, the proposed method reduces server traffic as no continuous uploading of the application log file is performed. Also, the proposed method consumes less memory as the application log files are deleted from the system after uploading to the application server. The proposed method ensures that the user data is very secure as the data is uploaded on the application server. Further, the proposed method reduces effort and saves time of developers to regenerate the event associated with the application in the system. Further, at the application server end, the uploaded application log files can be easily filtered based on different parameters such as system information which is uploaded along with the application log file.

Referring now to the drawings and more particularly to FIGS. 1 through 4D, where similar reference characters denote corresponding features consistently throughout the figures, there are shown preferred embodiments.

FIG. 1 is a block diagram of a system (100) for managing application logs, according to an embodiment as disclosed herein. The system (100) may be for example but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device and an immersive system. In an embodiment, the system (100) includes a memory (120), a communicator (140), a display (160) and a processor (180).

The memory (120) is configured to store multiple applications and corresponding application log files. Further, the memory (120) also stores instructions to be executed by the processor (180). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The communicator (140) includes an electronic circuit specific to a standard that enables wired or wireless communication. The communicator (140) is configured to communicate internally between internal hardware components of the system (100) and with external devices via one or more networks.

In an embodiment, the display (160) is the UI configured to display a user interface (UI) of the application where an event is determined. The display (160) can receive inputs and is made of one of liquid crystal display (LCD), light emitting diode (LED), organic light-emitting diode (OLED), etc. The user inputs may be provided as for example but not limited to touch, swipe, drag, gesture, voice command, etc.

The processor (180) communicates with the memory (120), the communicator (160), and the display (160). The processor (180) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU). In an embodiment, the processor (180) is implemented by processing circuitry such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductors. The processor (180) includes an event manager (182) and a log file manager (184).

In an embodiment, the event manager (182) is configured to detect an event associated with the application stored in the system (100) and send an indication to the log file manager (184) indicating that the event associated with the application is completed. The event associated with the application can be for example but not limited to, installing-uninstalling of the application, updating the application, sending or receiving data such as for example images, text, voice, etc., through the application, click event on an actionable element in the application UI, etc.

The event manager (182) is configured to determine data entered by a user to the system (100), a uniform resource locator (URL) used to call an application program interface (API) associated with the application while the event is performed: the response received from the application server (1000), through the API associated with the application while the event is performed and the payload associated with the event while the event associated with the application is performed at the system (100). The data entered by the user to the system (100) can be for example but not limited to, a text message, an image, voice input, etc. The event manager (182) is configured to determine an event status associated with the event as one of a failed event and a successful event and append an event status parameter and a color strip indicating the event status associated with the event, to the application log file based on the event status. The successful event can be for example, an auto update of the application, successful sending or receiving of an image, etc. The failed event can be for example, an application crash. For example, appending a new query parameter in API such as type=FAILED to indicate that the application log file is generated for the failed event case. On web a Red color Strip is appended to highlight Error Event Logs file and Green for other cases.

In an embodiment, the log file manager (184) is configured to create the application log file while the event associated with the application is performed at the system (100) by continuously writing the data entered by a user to the system (100), the URL used to call the API associated with the application while the event is performed: the response received from the application server (1000), through the API associated with the application while the event is performed and the payload associated with the event while the event associated with the application is performed at the system (100) to the application log file. Further, the log file manager (184) is configured to receive an indication from the event manager (182) indicating that the event associated with the application is completed and automatically upload the application log file and information associated with the system (100) to an application server (1000) corresponding to the application. The detection of the completion of the event is based on trigger points and can be running simultaneously or over a period of time. For example, upload the application log file when 10 clicks are performed within 2 seconds time by the user. The information associated with the system (100) includes but is not limited to username associated with the application in the system (100), an application version running on the system (100), a date of the event detected on the system (100), data inserted by the user to the application in the system (100).

Further, when there are multiple applications running, then multiple application log files are generated corresponding to each of the applications.

The log file manager (184) is configured to determine whether the upload of the application log file and the information associated with the system (100) to the application server (1000) corresponding to the application is successful. The log file manager (184) is configured to determine a location of the application log file stored in the memory (120) of the system (100) and delete the application log file stored in the memory (120) of the system (100), on determining that the upload of the application log file and the information associated with the system (100) to the application server corresponding to the application is successful. The log file manager (184) is configured to detect a user login to the application, determine the application log file in the memory (120) of the system (100), upload the application log file stored in the memory (120) of the system (100) to the application server, and delete the application log file stored in the memory (120) of the system (100), on determining that the upload of the application log file and the information associated with the system (100) to the application server corresponding to the application is not successful.

Further, the log file manager (184) is configured to check the application log file is available in the memory (120) of the system (100) at an elapse of a time threshold and automatically upload the application log file available in the memory (120) of the system (100) to the application server (1000). For example, Work Manager (Service) provided by Android may be used to provide a fixed time interval to check the application log files in Crash Report Folder (SD Card) and upload the application log file to the application server (1000).

For example, consider that a user is sending an image file through a chat application. Then, the application log file will include details such as a path of the image file which user is sending, the API using which the system (100) will send the image file, time of sending of the image file, a status code indicating if the image file is successfully uploaded or not to the application server (1000).

At least one of the plurality of modules/components of the processor (180) may be implemented through an AI model. A function associated with the AI model may be performed through memory (120) and the processor (180). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 1 shows various hardware components of the system (100), but it is to be understood that other embodiments are not limited thereon. In other embodiments, the system (100) may include less or a greater number of components. Further, the labels or names of the components are used only for illustrative purpose and does not limit the scope of the invention. One or more components can be combined to perform same or substantially similar function to managing application logs based on various events.

Figure 2:
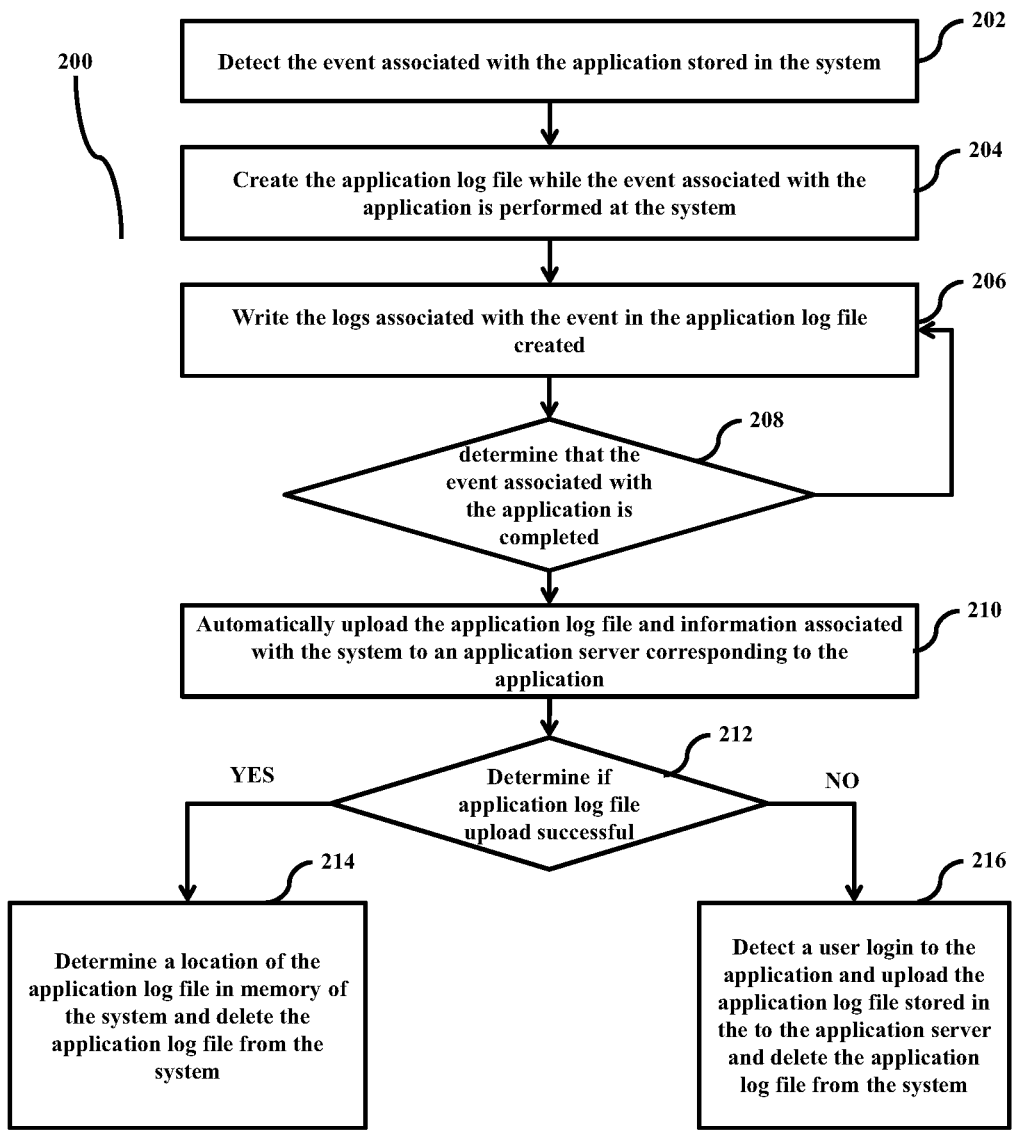
FIG. 2 is a flow chart illustrating a method for managing application logs by the system, according to an embodiment as disclosed herein.

FIG. 2 is a flow chart (200) illustrating a method for managing the application logs by the system (100), according to an embodiment as disclosed herein.

Referring to the FIG. 2, at step 202, the method includes the system (100) detecting the event associated with the application stored in the system (100). For example, in the system (100) as illustrated in the FIG. 1, the processor (180) is configured to detect the event associated with the application stored in the system (100).

At step 204, the method includes the system (100) creating the application log file while the event associated with the application is performed at the system (100). For example, in the system (100) as illustrated in the FIG. 1, the processor (180) is configured to create the application log file while the event associated with the application is performed at the system (100).

At step 206, the method includes the system (100) writing the logs associated with the event in the application log file created. For example, in the system (100) as illustrated in the FIG. 1, the processor (180) is configured to write the logs associated with the event in the application log file created.

At step 208, the method includes the system (100) determining that the event associated with the application is completed. For example, in the system (100) as illustrated in the FIG. 1, the processor (180) is configured to determine that the event associated with the application is completed.

At step 210, the method includes the system (100) automatically uploading the application log file and information associated with the system (100) to the application server (1000) corresponding to the application. For example, in the system (100) as illustrated in the FIG. 1, the processor (180) is configured to automatically upload the application log file and information associated with the system (100) to the application server (1000) corresponding to the application.

At step 212, the method includes the system (100) determining if application log file upload successful. For example, in the system (100) as illustrated in the FIG. 1, the processor (180) is configured to determine if application log file upload successful.

At step 214, the method includes the system (100) determining the location of the application log file in the memory (120) of the system (100) and delete the application log file from the system (100), on determining that the application log file upload is successful. For example, in the system (100) as illustrated in the FIG. 1, the processor (180) is configured to determine the location of the application log file in the memory (120) of the system (100) and delete the application log file from the system (100), on determining that the application log file upload is successful.

At step 216, the method includes the system (100) detecting the user login to the application and upload the application log file stored in the to the application server (1000) and delete the application log file from the system (100), on determining that the application log file upload is not successful. For example, in the system (100) as illustrated in the FIG. 1, the processor (180) is configured to detect the user login to the application and upload the application log file stored in the to the application server (1000) and delete the application log file from the system (100), on determining that the application log file upload is not successful.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 3A:
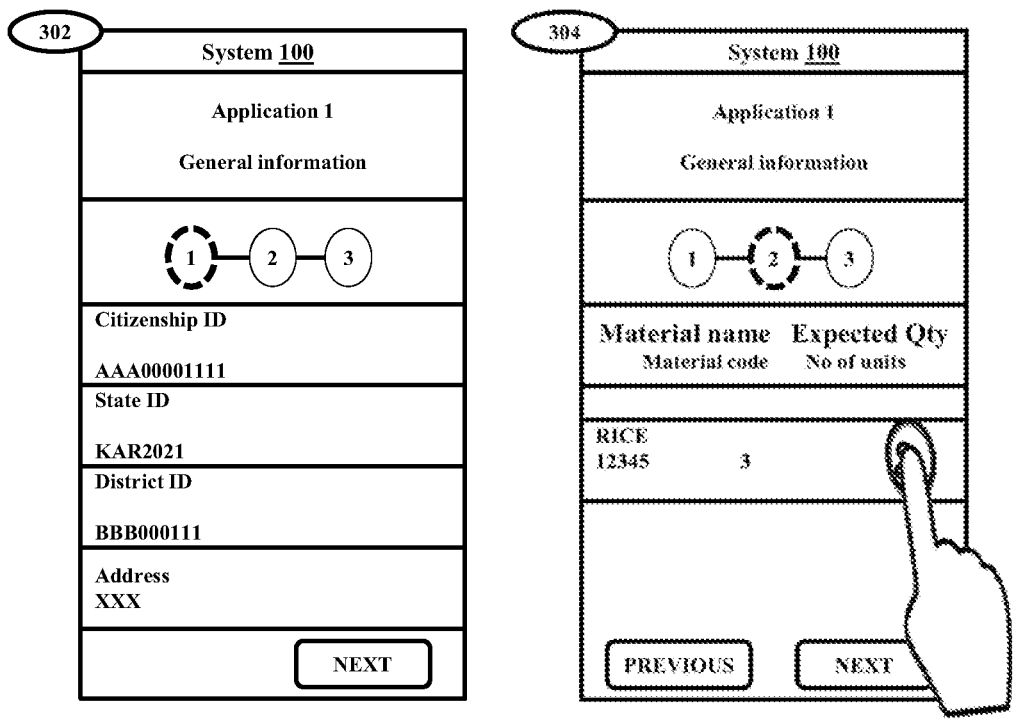
FIG. 3A is an example illustrating a scenario of events associated with an application used to create an application log file, according to an embodiment as disclosed herein.
Figure 3A:
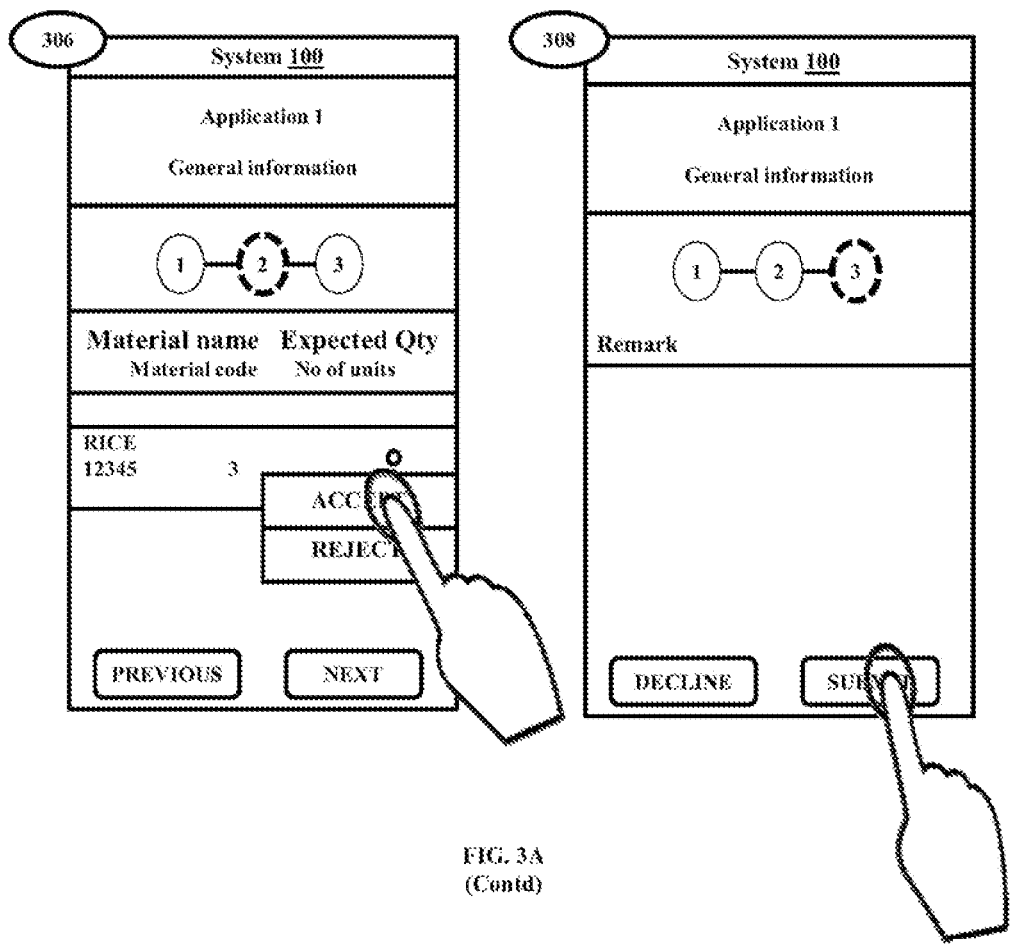

FIG. 3A is an example illustrating a scenario of events associated with an application used to create the application log file by the system (100), according to an embodiment as disclosed herein. Referring to the FIG. 3A, consider a form related application where the user is required to provide or fill-in various data in a form. The proposed method configured the system (100) to create the application log file when a predefined event is detected. Here, the predefined event is filling of the form. The form can be a single form or multiple forms. This created application log file is stored in a temporary memory of the system (100) such as secure digital (SD) card. At step 302, a UI of a first form is provided where the user is prompted to provide data such as citizenship ID, state ID, location ID and address. Once the user finishes filling the first form and clicks option "Next", the details filled by the user are written in the application log file.

At step 304, the system (100) on determining that the user has completed filling the first form, provides a second form. Here, the user is required to select a drop down option (indicated by user click at step 304). The user click is written to the application log file. Further, at step 306, the user is required to select either an accept or a reject option from the drop down option. For example, consider that the user selects the accept option. Then, the accept option selected by the user is also written in the application log file. Further, the user also selects the option "Next" in the second form. Then, the details filled by the user in the second form are written in the application log file.

Further, at step 308, the system (100) on determining that the user has completed filling the second form, provides a third form. The user may enter some remarks and then click on option "Submit" and the details filled by the user in the third form are written in the application log file. When the user click on option "Submit", the system (100) determines that the event of filling the form has ended. Therefore, the application log file comprising all the details provided by the user in the first form, the second form and the third form along with information related to the system (100) such as the version of the form application, date and time of generation of the application log file, are uploaded to the application server (1000). Once the system (100) determines that the application log file is successfully uploaded to the application server (1000), the application log file is deleted from the SD card. If the system (100) determines that the upload of the application log file is failed, then the system (100) re-uploads the application log file to the application server (1000) on detecting the user re-login to the application.

FIG. 3B is an example illustrating the application log file created by the system (100), according to an embodiment as disclosed herein. Referring to the FIG. 3B, the application log file includes the URL used to call the API associated with the application while the event is performed, a response received through the API associated with the application while the event is performed from the application server (1000) and the payload associated with the event, application log file is successfully uploaded is indicated by a status code of 200, if the application log file is not successfully uploaded then the status code is determined based on a reason of failure.

FIG. 4A is an example illustrating the plurality of application log files uploaded to the application server (1000), according to an embodiment as disclosed herein. Referring to the FIG. 4A, consider an example UI of the application server (1000)/citizen inventory which includes plurality of application log files which are uploaded by multiple systems (100). The plurality of application log files are provided on the UI along with other details such as the version of the application, a state name, citizenship ID of the system (100) from which the specific application log file is uploaded, login user who uploads the application log file, date and time of the upload, etc. Further, it can be observed that there are multiple uploads from multiple systems (100) continuously made.

FIG. 4B is an example illustrating a download option provided with respect to the application log file, according to an embodiment as disclosed herein. Referring to the FIG. 4B, in conjunction with the FIG. 4A, the application server (1000) provides more options that can be executed on the application log files such that at step 402 the user can download the application log file and use the application log file, to recreate the problem scenario to be able to troubleshoot the problem encountered by the system (100).

Figure 4C:
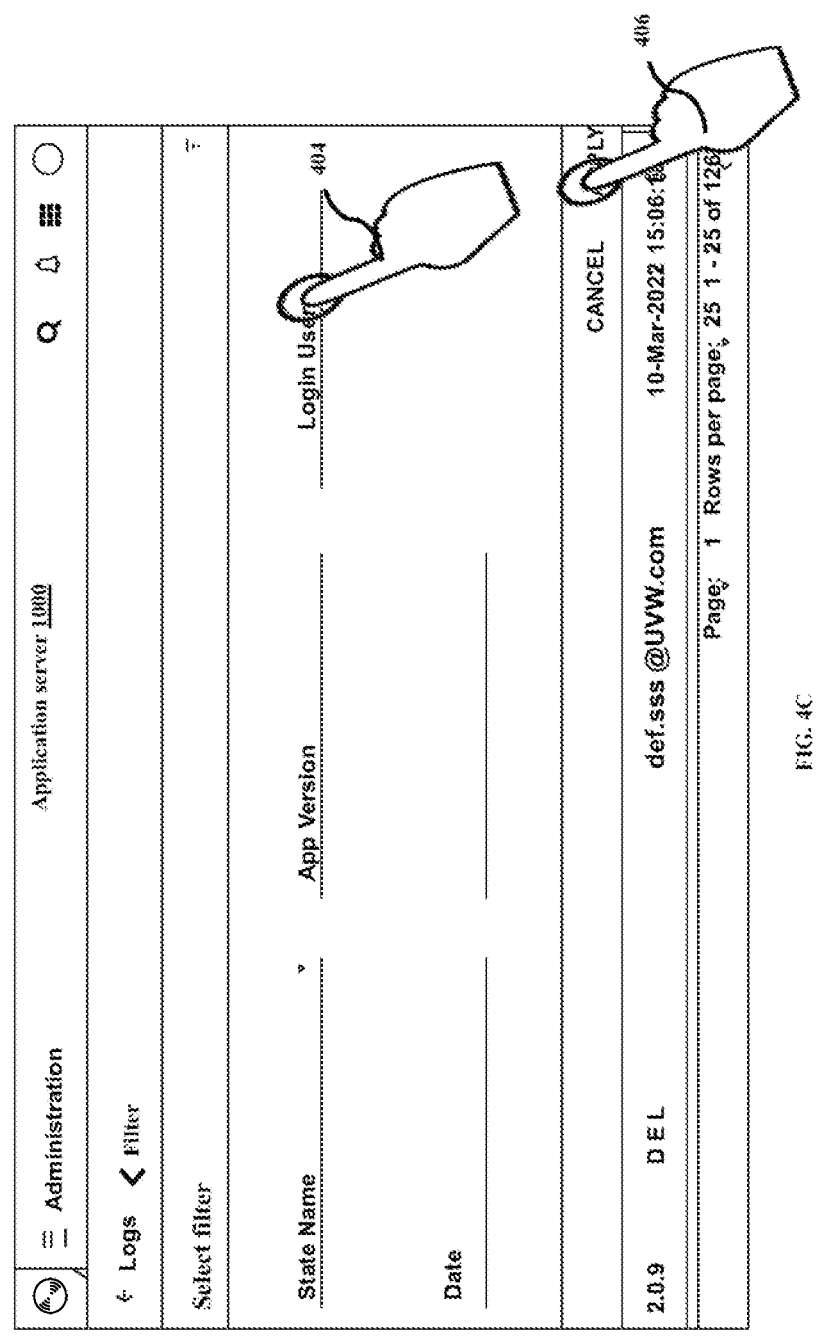

FIG. 4C is an example illustrating a filter window of the application server (1000), according to an embodiment as disclosed herein.

Figure 4D:
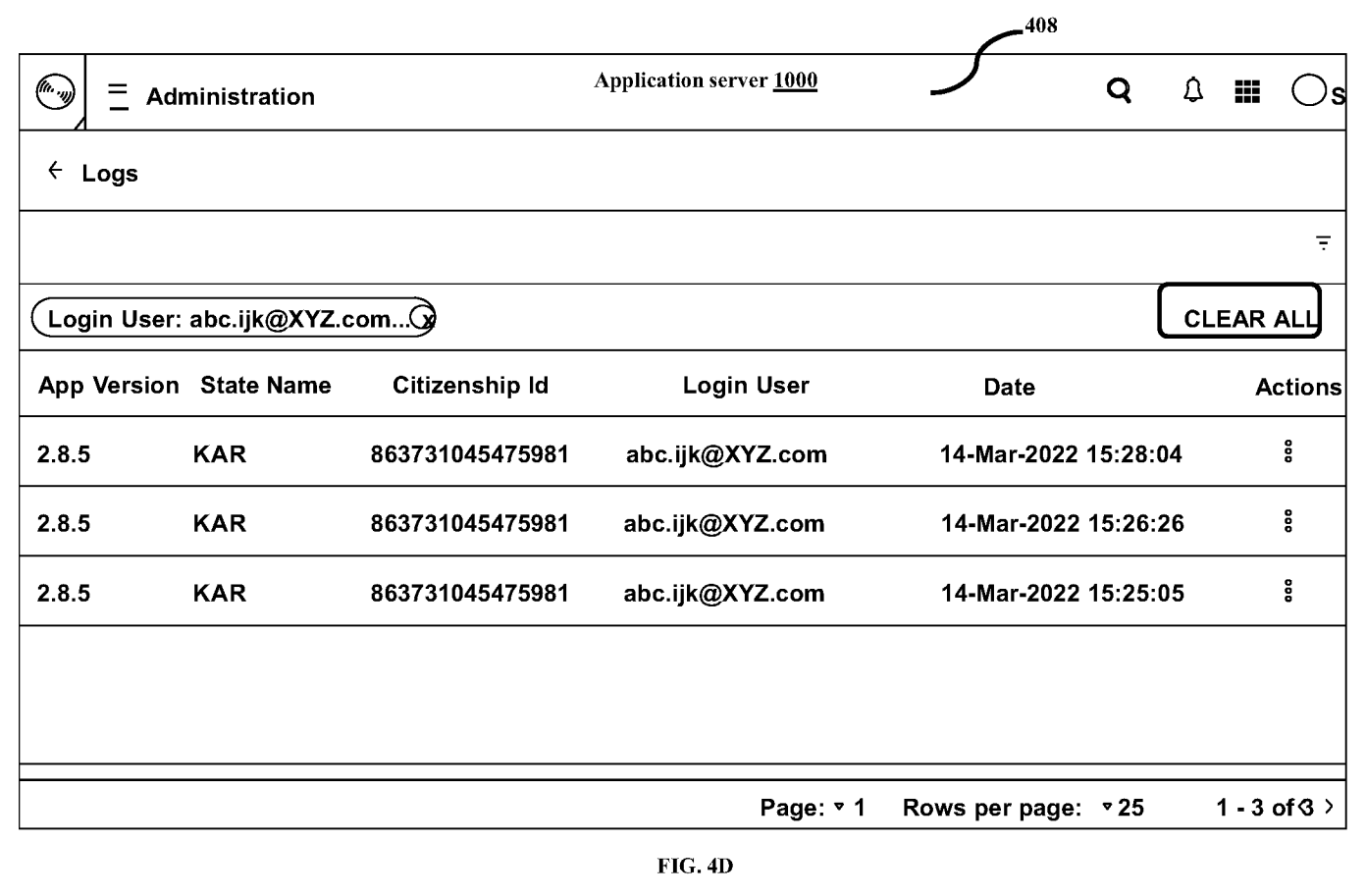

FIG. 4D is an example illustrating the filtered application log files of the plurality of application log files uploaded to the application server (1000), according to an embodiment as disclosed herein.

Referring to the FIG. 4C, in conjunction with the FIG. 4A, the filter window in the above mentioned application server (1000) is provided. Since the specific application log file is uploaded along with other details such as the version of the application, the state name, the citizenship ID of the system (100) from which the specific application log file is uploaded, the login user who uploads the application log file, the date and time of the upload, the other details can be used to filter specific application log file in the application server (1000). At step 404, the user selects the login user option to filter the application log files in the application server (1000), provides the required login user details and select option "apply" at step 406. At step 408, the filtered list of application log files are provided (as indicated in the FIG. 4D).

The user may further use the filtered list of application log files to get an understanding related to a specific type of technical problem, for learning a pattern of system behavior, etc.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for managing application logs by a system (100), wherein the method comprises:

detecting, by the processor (180) of the system (100), at least one event associated with at least one application stored in the system (100);

creating, by the processor (180), at least one application log file while the at least one event associated with the at least one application is performed at the system (100), wherein the at least one application log file comprises a uniform resource locator (URL) used to call at least one application program interface (API) associated with the at least one application while the at least one event is performed, a response received through the at least one API associated with the at least one application while the at least one event is performed from an application server (1000) and a payload associated with the at least one event;

determining, by the processor (180), that the at least one event associated with the at least one application is completed; and automatically uploading, by the processor (180), the at least one application log file and at least one information associated with the system (100) to the application server (1000) corresponding to the at least one application.

2. The method as claimed in claim 1, wherein creating, by the processor (180), the at least one application log file while the at least one event associated with the at least one application is performed at the system (100) comprises:

determining, by the processor (180), data entered by a user to the processor (180), the URL used to call the at least one API associated with the at least one application while the at least one event is performed; the response received from the application server (1000), through the at least one API associated with the at least one application while the at least one event is performed and the payload associated with the at least one event while the at least one event associated with the at least one application is performed at the system (100);

continuously writing, by the processor (180), the data entered by the user to the system (100), the URL used to call the at least one API associated with the at least one application while the at least one event is performed; the response received from the application server (1000), through the at least one API associated with the at least one application while the at least one event is performed and the payload associated with the at least one event while the at least one event associated with the at least one application is performed at the system (100) to the at least one application log file; and creating, by the processor (180), the at least one application log file while the at least one event associated with the at least one application is performed at the system (100).

3. The method as claimed in claim 2, wherein creating, by the processor (180), the at least one application log file while the at least one event associated with the at least one application is performed at the system (100) comprises:

determining, by the processor (180), an event status associated with the at least one event as one of a failed event and a successful event;

appending, by the processor (180), at least one of: an event status parameter and a color strip indicating the event status associated with the at least one event, to the at least one application log file; and creating, by the processor (180), the at least one application log file.

4. The method as claimed in claim 1, further comprising:

determining, by the processor (180), whether the upload of the at least one application log file and the at least one information associated with the system (100) to the application server (1000) corresponding to the at least one application is successful; and performing, by the processor (180), one of:

determining a location of the at least one application log file stored in a memory (120) of the system (100) and deleting the at least one application log file stored in the memory (120) of the system (100), in response to determining that the upload of the at least one application log file and the at least one information associated with the system (100) to the application server (1000) corresponding to the at least one application is successful, and detecting a user login to the application, determining the at least one application log file in the memory (120) of the system (100), uploading the at least one application log file stored in the memory (120) of the system (100) to the application server (1000), and deleting the at least one application log file stored in the memory (120) of the system (100), in response to determining that the upload of the at least one application log file and the at least one information associated with the system (100) to the application server (1000) corresponding to the at least one application is not successful.

5. The method as claimed in claim 1, wherein the at least one information associated with the system (100) comprises at least one of: username associated with the application in the system (100), an application version running on the system (100), a date of the at least one event detected on the system (100), data inserted by a user to the application in the system (100).

6. The method as claimed in claim 1, further comprising:

receiving, by the application server (1000), the at least one information associated with the system (100) as an input;

filtering, by the application server (1000), the at least one application log file of a plurality of application log files corresponding to the received at least one information associated with the system (100);

receiving, by the application server (1000), a request to download the filtered at least one application log file of the plurality of application log files corresponding to the received at least one information associated with the system (100);

downloading, by the application server (1000), the at least one application log file of the plurality of application log files corresponding to the received at least one information associated with the system (100); and regenerating, by the application server (1000), the at least one event detected in the system (100) based on the at least one application log file.

7. The method as claimed in claim 1, wherein automatically uploading, by the processor (180), the application log file and the at least one information associated with the system (100) comprises:

checking, by the processor (180), the at least one application log file is available in the memory (120) of the system (100) at an elapse of a time threshold; and automatically uploading, by the processor (180), the at least one application log file available in the memory (120) of the system (100) and the at least one information associated with the system (100) to the application server (1000).

8. A system (100) for managing application logs, wherein the system (100) comprises:

a memory (120);

a processor (180) coupled to the memory (120);

a communicator (160) coupled to the memory (120) and the processor (180) and wherein the processor (180) is configured to:

detect at least one event associated with at least one application stored in the system (100);

create at least one application log file while the at least one event associated with the at least one application is performed at the system (100), wherein the at least one application log file comprises a URL used to call at least one API associated with the at least one application while the at least one event is performed, a response received through the at least one API associated with the at least one application while the at least one event is performed from an application server (1000) and a payload associated with the at least one event;

determine that the at least one event associated with the at least one application is completed; and automatically upload the at least one application log file and at least one information associated with the system (100) to the application server (1000) corresponding to the at least one application.

9. The system (100) as claimed in claim 8, wherein the processor (180) is configured to create the at least one application log file while the at least one event associated with the at least one application is performed at the system (100) comprises:

determine data entered by a user to the system (100), the URL used to call the at least one API associated with the at least one application while the at least one event is performed; the response received from the application server (1000), through the at least one API associated with the at least one application while the at least one event is performed and the payload associated with the at least one event while the at least one event associated with the at least one application is performed at the system (100);

continuously write the data entered by the user to the system (100), the URL used to call the at least one API associated with the at least one application while the at least one event is performed; the response received from the application server (1000), through the at least one API associated with the at least one application while the at least one event is performed and the payload associated with the at least one event while the at least one event associated with the at least one application is performed at the system (100) to the at least one application log file; and create the at least one application log file while the at least one event associated with the at least one application is performed at the system (100).

10. The system (100) as claimed in claim 9, wherein the processor (180) is configured to create the at least one application log file while the at least one event associated with the at least one application is performed at the system (100) comprises:
  determine an event status associated with the at least one event as one of a failed event and a successful event;
  append at least one of: an event status parameter and a color strip indicating the event status associated with the at least one event, to the at least one application log file; and
  create the at least one application log file.

11. The system (100) as claimed in claim 8, wherein the processor (180) is further configured to:
  determine whether the upload of the at least one application log file and the at least one information associated with the system (100) to the application server (1000) corresponding to the at least one application is successful; and
  perform one of:
    determine a location of the at least one application log file stored in a memory (120) of the system (100) and delete the at least one application log file stored in the memory (120) of the system (100), in response to determining that the upload of the at least one application log file and the at least one information associated with the system (100) to the application server (1000) corresponding to the at least one application is successful, and
    detect a user login to the application, determine the at least one application log file in the memory (120) of the system (100), upload the at least one application log file stored in the memory (120) of the system (100) to the application server (1000), and delete the at least one application log file stored in the memory (120) of the system (100), in response to determining that the upload of the at least one application log file and the at least one information associated with the system (100) to the application server (1000) corresponding to the at least one application is not successful.

12. The system (100) as claimed in claim 8, wherein the at least one information associated with the system (100) comprises at least one of: username associated with the application in the system (100), an application version running on the system (100), a date of the at least one event detected on the system (100), data inserted by a user to the application in the system (100).

13. The system (100) as claimed in claim 8, wherein the processor (180) is configured to automatically upload the application log file and the at least one information associated with the system (100) comprises:
  check the at least one application log file is available in the memory (120) of the system (100) at an elapse of a time threshold; and
  automatically upload the at least one application log file available in the memory (120) of the system (100) and the at least one information associated with the system (100) to the application server (1000).

* * * * *